(12) United States Patent
Hall

(10) Patent No.: US 6,244,421 B1
(45) Date of Patent: Jun. 12, 2001

(54) SINGULATED RELEASE FOR A ZONED CONVEYOR SYSTEM

(75) Inventor: David V. Hall, Cookeville, TN (US)

(73) Assignee: Milwaukee Electronics Corporation, Milwaukee, WI (US)

( * ) Notice: Subject to any disclaimer, the term of this patent is extended or adjusted under 35 U.S.C. 154(b) by 0 days.

(21) Appl. No.: 09/082,108

(22) Filed: May 20, 1998

(51) Int. Cl.$^7$ .................................................... B65G 47/26
(52) U.S. Cl. ...................................... 198/460.1; 198/460.3
(58) Field of Search ............................. 198/460.1, 460.3, 198/781.06

(56) References Cited

U.S. PATENT DOCUMENTS

| | | |
|---|---|---|
| 3,075,630 | 1/1963 | Fisk . |
| 3,485,339 | 12/1969 | Miller et al. . |
| 3,605,986 | 9/1971 | Navin . |
| 3,817,368 | 6/1974 | Wentz et al. . |
| 3,960,262 | 6/1976 | Henig . |
| 3,982,625 | 9/1976 | Wentz et al. . |
| 4,231,465 | 11/1980 | Bourgeois . |
| 4,281,756 | 8/1981 | Bruno . |
| 4,629,058 | 12/1986 | Reissmann et al. . |
| 4,640,408 | 2/1987 | Eaves . |
| 4,653,630 | 3/1987 | Bravin . |
| 4,717,013 | 1/1988 | Reissmann et al. . |
| 4,815,582 | 3/1989 | Canziani . |
| 4,921,092 | 5/1990 | Crawford et al. . |
| 4,962,844 | 10/1990 | Francioni . |
| 5,038,915 | 8/1991 | Delsanto . |
| 5,058,727 | 10/1991 | Jahns et al. . |
| 5,070,995 | * 12/1991 | Schaffer et al. .................. 198/460.1 |
| 5,082,103 | 1/1992 | Ross et al. . |
| 5,137,139 | 8/1992 | Ruscello . |
| 5,186,308 | 2/1993 | Munro . |
| 5,228,558 | 7/1993 | Hall . |
| 5,285,887 | 2/1994 | Hall . |
| 5,318,167 | 6/1994 | Bronson et al. . |
| 5,341,916 | 8/1994 | Doane et al. . |
| 5,358,464 | 10/1994 | Funk et al. . |
| 5,582,286 | * 12/1996 | Kalm et al. ..................... 198/781.06 |
| 5,862,907 | * 1/1999 | Taylor ............................ 198/781.06 |

* cited by examiner

Primary Examiner—Joseph E. Valenza
(74) Attorney, Agent, or Firm—Andrus, Sceales, Starke & Sawall, LLP

(57) ABSTRACT

An accumulating conveyor system for transporting a series of loads includes a series of conveyor zones including at least an upstream conveyor zone and a downstream conveyor zone. Each conveyor zone includes a drive arrangement for operating the conveyor zone to advance loads therealong. An improved singulated release control is interconnected with each drive arrangement. The control is operable to advance adjacent first and second loads on adjacent upstream and downstream conveyor zones, respectively. The control is operable to stop operation of the upstream zone to maintain the second load stationary, while continuing operation of the downstream zone to advance the first load. When the downstream load approaches the downstream end of the downstream conveyor zone, the control is operable to resume operation of both the downstream and upstream conveyor zones, to continue advancement of the first and second loads, respectively. In this manner, the first load is discharged from the downstream zone while the second load is advanced from the upstream conveyor zone onto the downstream conveyor zone, to maintain a single load per zone ratio while providing a more compact arrangement of loads on the conveyor zones.

10 Claims, 2 Drawing Sheets

SINGULATED RELEASE FOR A ZONED CONVEYOR SYSTEM

BACKGROUND AND SUMMARY

This invention relates to accumulating conveyors, and more particularly to a control system for an accumulating conveyor which is operable to advance loads in a singulated manner along the conveyor system.

An accumulating conveyor generally includes a series of zones which can be selectively controlled to allow articles being conveyed to accumulate in a selected area of the conveyor. Examples of control systems for providing certain functions of an accumulating conveyor are disclosed in Hall U.S. Pat. No. 5,225,558 issued Jul. 20, 1993 and Hall U.S. Pat. No. 5,285,887 issued Feb. 15, 1994.

Methods for operating accumulating conveyors have been well established over the years. One such method is known as train release, which is operable to run multiple zones simultaneously regardless of whether or not there is a load on the zone. Train release is typically used near the discharge end of an accumulating conveyor to provide a large quantity of objects in rapid succession. While this method of control provides a high throughput of loads on the conveyor, it is disadvantageous in that there is an overall loss of control of the conveyor. Further, train release typically enables a single zone to carry multiple loads, which is undesirable in certain circumstances when it is necessary to ensure there is only a single load per zone, such as when loads are being weighed, sorted, counted, packaged or subject to any other operation to be carried out on a single load.

To ensure each zone carries only a single load, it is known to control an accumulating conveyor to provide singulated release of loads. In a singulated release control, the conveyor zones are controlled such that a load is discharged from one zone only when the immediately adjacent downstream zone is empty. Singulated release control is generally used to fill accumulating conveyors and to operate as a normal transport mode. This type of control is a very straightforward approach which can be accomplished using air logic, mechanical switches, combinations of clutches and brakes, or individually powered conveyor sections. While conventional singulated release is operable and generally satisfactory, it is disadvantageous in that the conveyor throughput is relatively low. At any given time in the transport mode, less than half of the total length of the conveyor is occupied since adjacent loads will be separated by a gap at least equal to the length of each conveyor zone.

It is an object of the present invention to provide an improved singulated release control for an accumulating conveyor to increase the throughput of the conveyor. It is a further object of the invention to provide an improved singulated release control which increases throughput by minimizing the gap between adjacent loads. Another object of the invention is to provide such a conveyor control which is simple in its operation and easy to implement for use in conventional conveyor control systems.

In accordance with the invention, a conveyor system for transporting a series of loads includes a series of conveyor zones which includes at least an upstream conveyor zone and a downstream conveyor zone. A drive arrangement is interconnected with each conveyor zone for operating each conveyor zone to advance loads along the conveyor system. The invention contemplates a control arrangement interconnected with each drive arrangement, with the control arrangement being operable on each drive arrangement to initially operate the upstream and downstream conveyor zones to advance adjacent first and second loads thereon. The control arrangement is further operable to stop operation of the upstream conveyor zone when the first load is discharged from the upstream conveyor zone and is supported by the downstream conveyor zone and the second load is supported by the upstream conveyor zone, to maintain the second load stationary. The control arrangement is further operable to maintain operation of the downstream conveyor zone to advance the first load relative to the second load on the downstream conveyor zone, and to thereafter resume operation of the upstream conveyor zone when the first load approaches the downstream end of the downstream conveyor zone, to simultaneously advance the first and second loads on the downstream and upstream conveyor zones, respectively. Each conveyor zone includes a downstream sensor adjacent its downstream end. The control arrangement is responsive to inputs from the sensors, and preferably includes a control module for each conveyor zone to control the drive arrangement interconnected with the conveyor zone. The control arrangement is preferably operable to stop operation of the upstream conveyor zone when the first load is discharged from the upstream conveyor zone and the subsequent load on the upstream conveyor zone reaches the downstream end of the upstream conveyor zone, in response to inputs from the sensor of the upstream conveyor zone. The control arrangement is further operable to resume operation of the upstream conveyor zone when the first load approaches the downstream end of the downstream conveyor zone, in response to an input from the sensor of the downstream conveyor zone.

The invention further contemplates a method of controlling a conveyor having adjacent upstream and downstream conveyor zones for advancing a series of loads, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
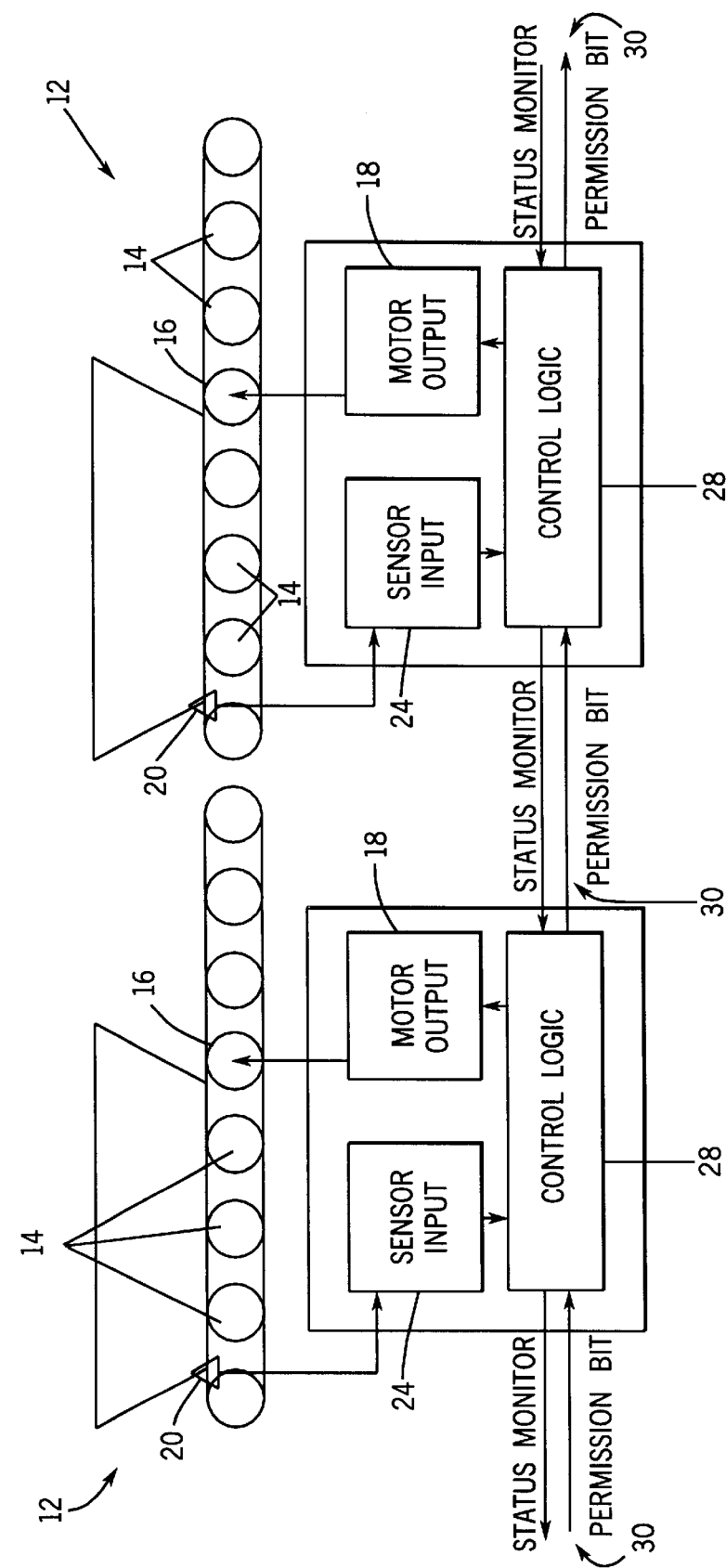
FIG. 1 is a schematic side elevation view showing adjacent zones of an accumulating conveyor and a control and drive arrangement for each zone, for controlling operation of the conveyor in accordance with the present invention.

Referring to FIG. 1, an accumulating conveyor 10 includes a series of adjacent conveyor zones, each of which is shown at 12. Each conveyor zone 12 includes a conveyor frame having side rails in accordance with conventional construction, and a series of idler rollers 14 rotatably mounted between the side rails. Rollers 14 collectively define a load carrying surface for transporting a load from an upstream end of each zone 12 to a downstream end.

Each conveyor zone 12 further includes a drive roller 16 which is drivingly interconnected with each idler roller 14, typically by a series of belts in a manner as is known. In this manner, rotation of drive roller 16 results in simultaneous rotation of all idler rollers 14 in each zone 12.

In a preferred embodiment, each drive roller 16 includes a DC motor and gear assembly which are contained within the roller tube. This type of drive roller is known to those skilled in the art, and may representatively be a drive roller as described in U.S. Pat. No. 5,088,596, the disclosure of which is hereby incorporated by reference. The motor incorporated within drive roller 16 includes an output shown schematically at 18, which is interconnected with drive roller 16 in a manner as is known so as to cause rotation of drive roller 16 in response to operation of the motor contained within roller 16.

Each zone 12 further includes a downstream sensor 20 adjacent its downstream end. Sensors 20 may be in the form of a conventional photocell including a sensor input 24. A control module 28 is provided for each zone 12, and sensor input 24 is interconnected with the zone control module 28 for providing inputs from sensor 20 to control module 24. In addition, control module 28 is interconnected with motor output 18 for controlling operation of drive roller 16, again in a manner as is known.

Representatively, control module 28 may be in the form of a programmable logic controller such as is available from the Aromat Division of Matsushita Electric under its designation FPM, which can be programmed in accordance with conventional technology to control operation of motor output 18 in the manner explained hereafter, as well as other functions of conveyor zone 12. A communication link 30 extends between and interconnects adjacent control modules 28.

Figure 2:
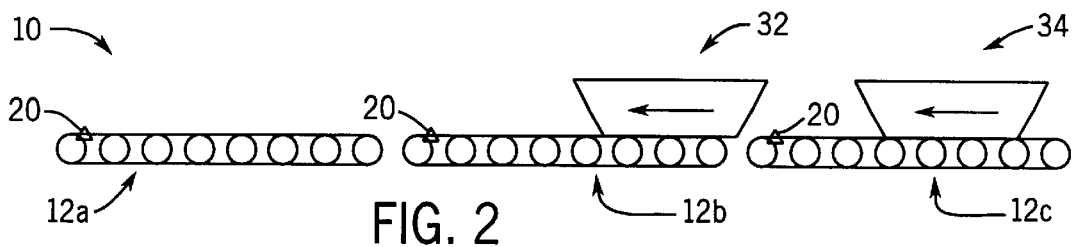
FIGS. 2–4 are schematic side elevation views showing a series of adjacent conveyor zones as shown in FIG. 1, illustrating advancement of loads thereon and control of the conveyor zones in accordance with the present invention.
Figure 3:
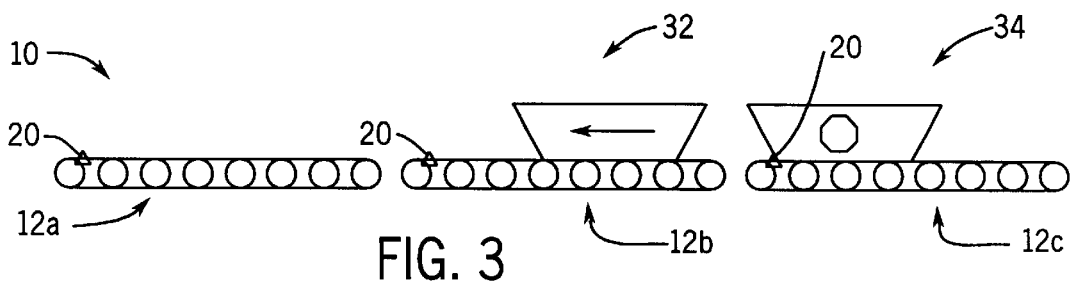
Figure 4:
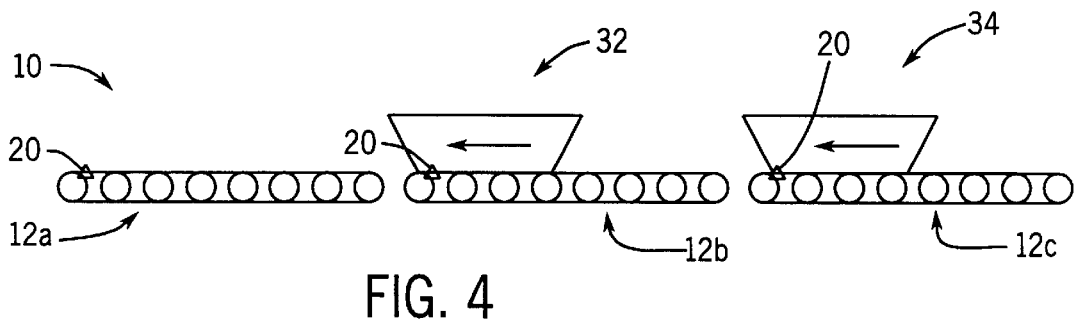

In a manner as is known, a series of conveyor zones 12 are placed adjacent each other in an end-to-end relationship so as to define a conveyor assembly for transporting a series of loads. A portion of such a conveyor assembly is illustrated in FIGS. 2–4. The adjacent conveyor zones illustrated in FIGS. 2–4 are constructed as shown and described with respect to FIG. 1, and the zones are denoted 12a, 12b and 12c, with zone 12a being the most downstream conveyor zone.

A series of loads, an adjacent pair of which are shown at 32, 34, are carried by zones 12 of conveyor 10. Zones 12 are controlled by control modules 28 in a manner providing singulated release of loads 32 and 34, such that each zone supports a single load.

FIG. 2 illustrates load 32 being advanced by operation of zone 12b and load 34 being advanced by operation of zone 12c. Sensor 20 of zone 12c is clear, providing an input to control module 28 of zone 12c that the trailing end of load 32 has been discharged from zone 12c and that the leading end of load 34 has not reached downstream sensor 20 of zone 12c. Sensor 20 of zone 12b is also clear, providing an input to control module 28 of zone 12b that the leading end of load 32 has not reached the downstream end of zone 12b.

FIG. 3 illustrates continued operation of zone 12b to advance load 32 on zone 12b. FIG. 3 also shows the leading end of load 34 reaching the downstream end of zone 12c to block sensor 20 of zone 12c. When control module 28 of zone 12c obtains the blocked signal from sensor 20 of zone 12c, control module 28 stops operation of motor output 18 to stop advancement of load 34 thereon. In addition, control module 28 of zone 12c sends an accumulate signal to the adjacent upstream zone to suspend operation to prevent advancement of a load thereon. In this manner, load 34 and all loads upstream therefrom on contiguous full zones are maintained stationary on their respective zones. Simultaneously, zone 12b continues operation to advance load 32 toward its downstream end.

When load 32 approaches the downstream end of zone 12b, as shown in FIG. 4, the leading end of load 32 blocks downstream sensor 20 of zone 12b, which provides an input to control module 28 of zone 12b that the leading end of load 32 is located at the downstream end of zone 12b. When load 32 has attained this position, control module 28 of zone 12b sends a signal to all upstream zones to resume operation, such that downstream movement of load 34 on zone 12c is resumed. Operation of zone 12b is continued, to move load 32 onto the upstream end of zone 12a. Simultaneously, operation of zone 12c continues to advance load 34 from the downstream end of zone 12c and onto the upstream end of zone 12b, until loads 32 and 34 attain the same position on zones 12a and 12b as described previously with respect to zones 12b and 12c, respectively, with reference to FIG. 2. The same series of steps is then repeated for zones 12a and 12b and all subsequent zones, to advance loads 32 and 34 thereon. In addition, all upstream singulated release conveyor zones are controlled in the same manner, to ensure that all loads are advanced in the desired singulated fashion.

In practice, each control module 28 continuously monitors the status of each downstream control module 28 through communication link 30. If the conveyor system is in the transport mode as shown in FIG. 2, the control module 28 of the downstream conveyor zone 12 communicates a permission bit over communication link 30 to the upstream control module 28. With the permission bit present, the control module 28 of the upstream conveyor zone operates the zone motor output 18 to impart rotation to drive roller 16 and to thereby transport the load carried by the upstream conveyor zone 12. If the conveyor system, or any individual zone thereof, is in the accumulate mode, the control module 28 of the downstream conveyor zone 12 does not communication a permission bit over communication link 30, and operation of the upstream conveyor zone 12 is suspended until a permission bit is received.

The logic for controlling conveyor system 10 can be expressed as follows, where low equals true:

$A(out)=Low$ IF: $\{A(in)=Low$ AND: $(T_{C(in)}=Low$ OR: $B_{(in)}=Low)\}$OR: $\{T_{C(in)}=Low$ AND: $B_{(in)}=High\}$ Where:

A(out)=signal communicated to the adjacent upstream zone preventing an object being conveyed from entering the zone being controlled;

A(in)=accumulation command: prevents the object being conveyed from leaving the zone being controlled;

$T_{C(in)}$=time delay added to electronically controlled systems to allow objects shorter than the distance between sensors to be conveyed from the upstream sensor to the downstream sensor;

B(in)=signal from sensor indicating that downstream edge of the zone being controlled is occupied.

The operation of zones 12, as described above, is carried out by software programmed into control module 28 of each zone 12, in a manner as is known to one skilled in the art. With zones 12 being controlled in this manner, it is possible to always maintain a ratio of a single load per zone, to ensure a single load is present when desired for such operations as automated weighing, sorting, counting or packaging, or when it is desired to introduce packages into another part of a conveyor system, such as a vertical lift or the like. This control system is limited only by the speed of the system and the length of the longest zone, and system throughput can be calculated according to the following formula:

Continuous System Throughput (packages/minute)={System speed (inches/minute)}÷{(Length of longest zone (inches)}

This system provides significant advantages over conventional singulated release control, in that advancement of an upstream load begins as soon as the load downstream therefrom has reached the downstream end of the downstream conveyor zone. It is often the case that a single zone may be supporting both the upstream end of a downstream load and the downstream end of an upstream load, but controlling the conveyor zones in accordance with the present invention nonetheless ensures that each zone fully supports only a single load.

Various alternatives and embodiments are contemplated as being within the scope of the following claims particularly pointing out and distinctly claiming the subject matter regarded as the invention.

I claim:

1. A conveyor system for transporting a series of loads, comprising:
   a series of conveyor zones including at least a selectively operable upstream conveyor zone and a selectively operable downstream conveyor zone;
   a drive arrangement interconnected with the upstream and downstream conveyor zones for selectively operating each conveyor zone to advance the loads along the conveyor system; and
   a control arrangement interconnected with each drive arrangement, wherein the control arrangement is operable on each drive arrangement to: selectively operate the upstream and downstream conveyor zones to advance adjacent first and second loads thereon at a rate of speed, wherein the first and second loads travel at different rates of speed in the event the coefficient of friction varies between the first and second loads and the respective downstream and upstream conveyor zones; stop operation of the upstream conveyor zone when the first load is discharged from the upstream conveyor zone and is supported solely by the downstream conveyor zone and the second load reaches a predetermined position on the upstream conveyor zone and is supported solely by the upstream conveyor zone, to maintain the second load stationary on the upstream conveyor zone; maintain operation of the downstream conveyor zone while operation of the upstream conveyor zone is stopped, to advance the first load on the downstream conveyor zone relative to the second load to a predetermined position on the downstream conveyor zone corresponding to the predetermined position of the first load on the upstream conveyor zone; and simultaneously operate both the downstream conveyor zone and the upstream conveyor zone when the first load reaches the predetermined position on the downstream conveyor zone, to simultaneously advance the first and second loads on the upstream and downstream conveyor zones, respectively;
   wherein the control arrangement operates the conveyor zone drive arrangements so as to maintain a one-to-one relationship between the conveyor zones and the loads supported on and advanced by the conveyor zones.

2. The conveyor system of claim 1, wherein each conveyor zone includes a sensor adjacent its downstream end for detecting the position of a load thereon and outputting a signal in response thereto, wherein the control arrangement is responsive to signals from the sensors.

3. The conveyor system of claim 2, wherein the control arrangement includes a control module for each conveyor zone, wherein the control arrangement is operable to control the drive arrangement interconnected with each conveyor zone.

4. The conveyor system of claim 3, wherein the control arrangement is operable to stop operation of the upstream conveyor zone when the first load is completely discharged from the upstream conveyor zone in response to a signal from the sensor of the upstream conveyor zone indicative of discharge of the first load from the upstream conveyor zone.

5. The conveyor system of claim 2, wherein the control arrangement is operable to resume operation of the upstream conveyor zone during operation of the downstream conveyor zone to advance the first load toward the downstream end of the downstream conveyor zone, in response to a signal from the sensor of the downstream conveyor zone.

6. A method of controlling a conveyor having adjacent upstream and downstream conveyor zones for advancing a series of loads, comprising the steps of:
   selectively operating the conveyor zones at a rate of speed to advance a first load on the downstream conveyor zone and a second load on the upstream conveyor zone wherein the first and second loads travel at different rates of speed in the event the coefficient of friction varies between the first and second loads and the respective conveyor zones;
   stopping operation of the upstream conveyor zone when the first load is supported by the downstream conveyor zone and the second load reaches a predetermined position on the upstream conveyor zone before the first load reaches a predetermined position on the downstream conveyor zone corresponding to the predetermined position of the second load on the upstream conveyor zones to maintain the second load stationary on the upstream conveyor zone;
   continuing operation of the downstream conveyor zone to advance the first load thereon to the predetermined position on the downstream conveyor zone corresponding to the predetermined position of the first load on the upstream conveyor zone, while operation of the upstream conveyor zone is stopped and the second load is maintained stationary on the upstream conveyor zone; and
   thereafter simultaneously operating both the upstream conveyor zone and the downstream conveyor zone when the first load reaches the predetermined position on the downstream conveyor zone to simultaneously advance the first load on the downstream conveyor zone and the second load on the upstream conveyor zone;
   wherein operation of the conveyor system maintains a one-to-one relationship between the conveyor zones and the loads supported on and advanced by the conveyor zones.

7. The method of claim 6, wherein each conveyor zone includes a sensor adjacent its downstream end for detecting the presence of a load and providing a signal in response thereto, and wherein the conveyor control method is carried out in response to signals from the sensors.

8. The method of claim 7, wherein the step of stopping operation of the upstream conveyor zone when the first load is supported by the downstream conveyor zone, is carried out in response to a signal from the sensor of the upstream conveyor zone indicative that the first load is completely discharged from the upstream conveyor zone and thereby solely supported by the downstream conveyor zone.

9. The method of claim 7, wherein the step of simultaneously operating both the upstream conveyor zone and the downstream conveyor zone is carried out by resuming operation of the upstream conveyor zone when the first load reaches the predetermined position on the downstream conveyor zone, in response to a signal from the sensor of the downstream conveyor zone indicative that the first load has reached the downstream end of the downstream conveyor zone.

10. In an accumulating conveyor having a series of conveyor zones including at least an upstream conveyor zone and a downstream conveyor zone and a drive arrangement interconnected with each conveyor zone for operating each conveyor zone to advance respective first and second loads therealong, wherein each conveyor zone defines an upstream end and a downstream end, the improvement comprising:

a pair of downstream sensors, wherein one of the downstream sensors is located adjacent the downstream end of the downstream conveyor zone and the other of the downstream sensors is located adjacent the downstream end of the upstream conveyor zone; and a control arrangement responsive to the downstream sensors, wherein the control arrangement is operably interconnected with the drive arrangement to: selectively operate the upstream and downstream conveyor zones at a rate of speed to advance the first and second loads thereon, wherein the first and second loads travel at different rates of speed in the event the coefficient of friction varies between the first and second loads and the respective conveyor zones; stop operation of the upstream conveyor zone when the second load is supported by the upstream conveyor zone and reaches a predetermined position on the upstream conveyor zone, in response to an input from the downstream sensor of the upstream conveyor zone indicative that the first load is discharged from the upstream conveyor zone and is solely supported by the downstream conveyor zone, wherein stopping operation of the upstream conveyor zone is operable to maintain the second load stationary on the upstream conveyor zone; operate the downstream conveyor zone while operation of the upstream conveyor zone is stopped, to advance the first load on the downstream conveyor zone relative to the second load to a predetermined position on the downstream conveyor zone corresponding to the predetermined position of the first load on the upstream conveyor zone; and operate the upstream conveyor zone in response to an input from the downstream sensor of the downstream conveyor zone indicative that the first load has reached the downstream end of the downstream conveyor zone, while maintaining operation of the downstream conveyor zone, to simultaneously advance the first and second loads on the downstream and upstream conveyor zones, respectively;

wherein the control arrangement operates the conveyor zones so as to maintain a one-to-one relationship between the conveyor zones and the loads supported on and advanced by the conveyor zones.

\* \* \* \* \*